Figure 1:
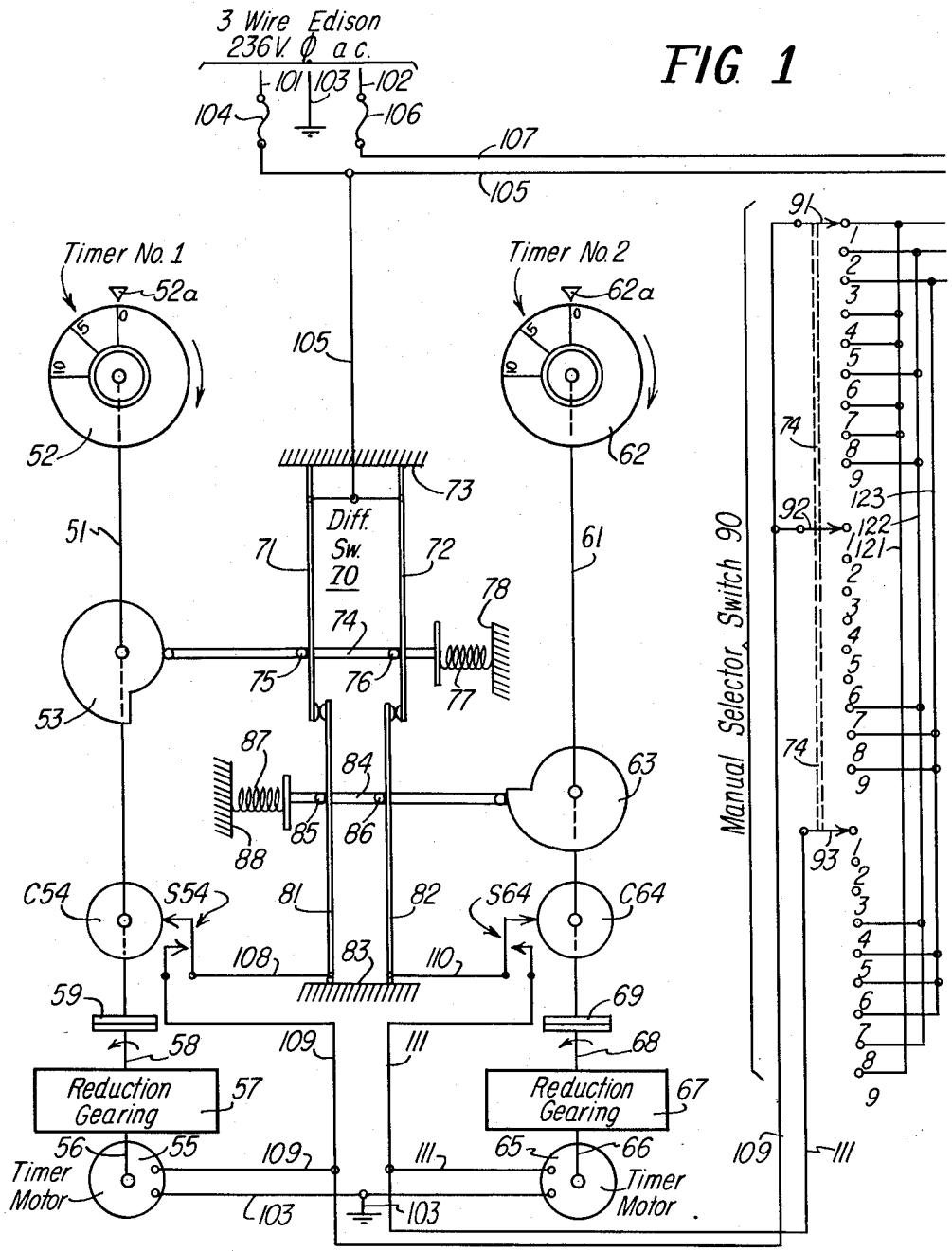

April 3, 1962 D. O. BAIRD 3,028,472
TIMER SYSTEMS FOR COOKING APPARATUS, OR THE LIKE
Filed Jan. 14, 1959 2 Sheets-Sheet 2

INVENTOR.
Douglas O. Baird
BY
Pongley, Baird, Clayton, Miller & Vogel,
Attys.

United States Patent Office 3,028,472
Patented Apr. 3, 1962

3,028,472
TIMER SYSTEMS FOR COOKING APPARATUS, OR THE LIKE
Douglas O. Baird, Skokie, Ill., assignor to General Electric Company, a corporation of New York
Filed Jan. 14, 1959, Ser. No. 786,814
11 Claims. (Cl. 219—20)

The present invention relates to timer systems for cooking apparatus, or the like, and more particularly to such timer systems for combination electronic and electric ovens.

It is the general object of the present invention to provide in cooking apparatus that includes a plurality of control devices that are selectively operative to produce a corresponding plurality of distinct cooking effects therein, an improved timer system that comprises a plurality of independent manually settable controllers for selectively presetting a corresponding plurality of time intervals for the corresponding cooking effects, and timing mechanism governed by the controllers for producing the corresponding preset cooking effects during the corresponding preset time intervals and so that the corresponding preset time intervals are terminated together.

Another object of the invention is to provide in a combination electronic and electric oven, an improved control arrangement so that an electronic cooking effect and an electric cooking effect may be carried out in a simple and ready manner during two corresponding and different preset time intervals that terminate together.

Another object of the invention is to provide in an electronic oven that includes a first facility for producing a deep cooking effect and a second facility for producing a shallow cooking effect, an improved control arrangement so that the two cooking effects may be carried out during two corresponding and different preset time intervals that terminate together.

A further object of the invention is to provide a timer system comprising first and second independent manually operable members respectively corresponding to first and second distinct controls, wherein each of the members includes an off position and a variable on position and is selectively operative into its variable on position to preset a corresponding variable time interval, whereby the members may be selectively operated initially to preset either the same time interval or different time intervals, timer mechanism operative to return each of the members from its variable on position back into its off position in a time interval corresponding to that preset thereby, differential mechanism selectively operated jointly by the members and governed in response to the presetting of different time intervals by the two members for operating the timer mechanism to return toward its off position only the one of the members presetting the longer time interval and governed in response to the presetting of the same time interval by the two members for operating the timer mechanism to return toward their off positions both of the members, and switching mechanism governed during the return of the two members back into their respective off positions for producing two respectively corresponding useful controls.

Further features of the invention pertain to the particular arrangement of the elements of the apparatus, whereby the above-outlined and additional operating features thereof are attained.

Figure 2:
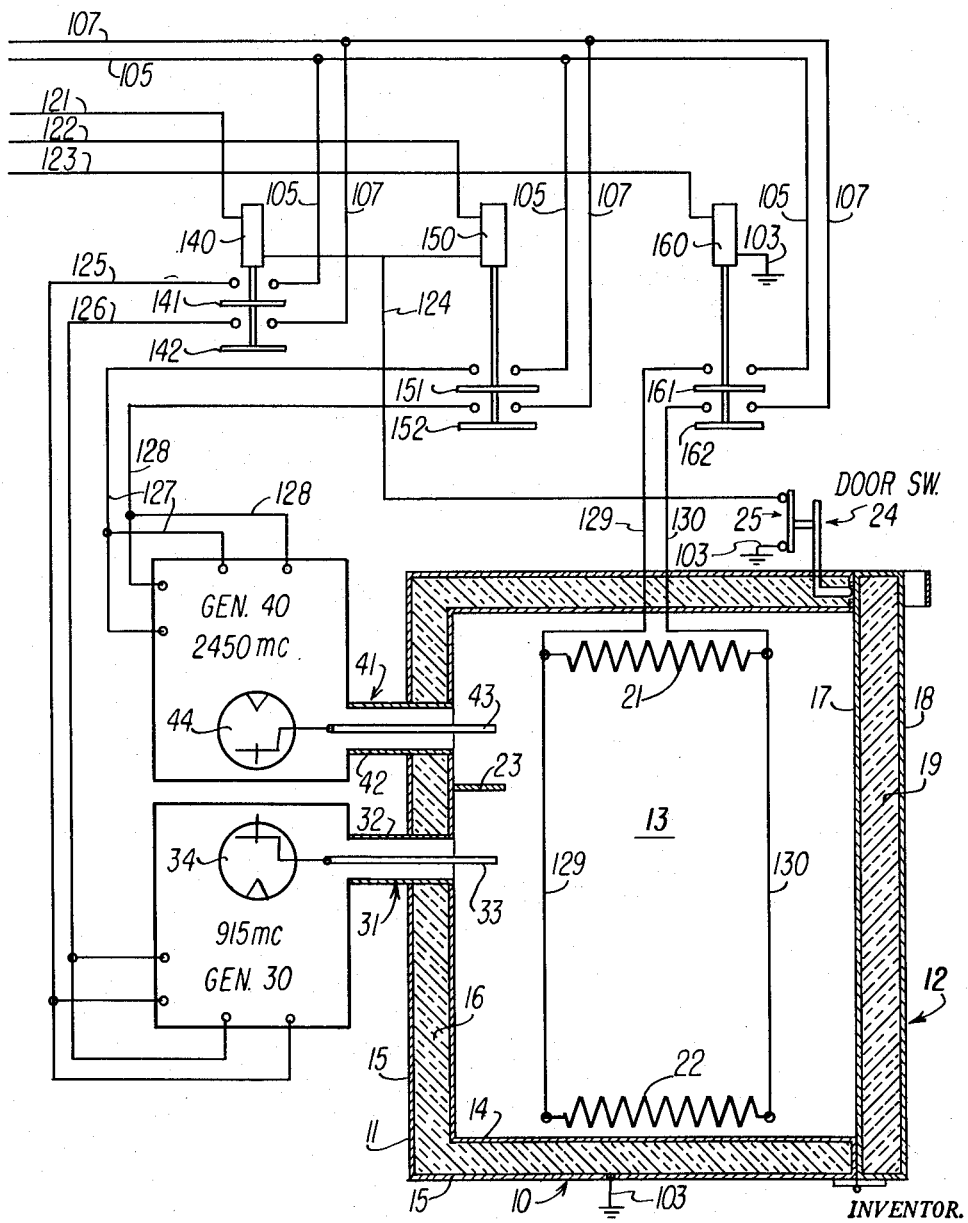

The invention, both as to its organization and method of operation, together with further object and advantages thereof, will be best understood by reference to following specification taken in connection with the accompanying drawings, in which:

FIGURES 1 and 2, taken together, when arranged in upstanding side-by-side relation, are a diagrammatic illustration of a combination electronic and electric oven and control circuit therefor embodying the present invention.

Referring now to FIGS. 1 and 2 of the drawings, the heating system there illustrated, and embodying the features of the present invention, comprises an oven 10 including a housing section 11 provided with an open front, and a front door section 12, and defining an oven cavity or chamber 13, the front door section 12 being mounted adjacent to the lower edge thereof upon the lower front of the housing section 11 for movements between a substantially vertical closed position and a substantially horizontal open position. The housing section 11 comprises a metal inner liner 14 and a metal outer shell 15 arranged generally in spaced-apart relation with thermal insulation 16 therebetween; and similarly, the door section 12 comprises a metal inner liner 17 and a metal outer shell 18 arranged generally in spaced-apart relation with thermal insulation 19 therebetween. The oven 10 is of the combination electronic and electric type; whereby upper and lower electric heating units 21 and 22 are arranged in the oven chamber 13 respectively adjacent to the top and bottom walls of the liner 14; first electromagnetic wave energy may be supplied to the oven chamber 13 via a transmission line 31; and second electromagnetic wave energy may be supplied to the oven chamber 13 via a transmission line 41. The line 31 may be of the coaxial conductor type, including an exterior tubular grounded metal sheath 32 and an interior rod-like ungrounded metal conductor 33, the extreme outer end of the sheath 32 being electrically connected to the shell 15 and to the liner 14 of the housing section 11, and the extreme outer end of the conductor 33 projecting through aligned openings provided in the shell 15 and in the liner 14 of the housing section 11 and into the oven chamber 13 and constituting an antenna for radiating the first electromagnetic wave energy into the oven chamber 13. Similarly, the line 41 may be of the coaxial conductor type, including an exterior tubular grounded metal sheath 42 and an interior rod-like ungrounded metal conductor 43, the extreme outer end of the sheath 42 being electrically connected to the shell 15 and to the liner 14 of the housing section 11, and the extreme outer end of the conductor 43 projecting through aligned openings provided in the shell 15 and in the liner 14 of the housing section 11 and into the oven chamber 13 and constituting an antenna for radiating the second electromagnetic wave energy into the oven chamber 13.

The control circuit comprises a first ultra-high frequency generator or oscillator 30, including a magnetron 34, and a second ultra-high frequency generator or oscillator 40, including a magnetron 44. The magnetron 34 is tuned to a first frequency $f_1$ in the ultra-high frequency band (such, for example, as 915 mc.), and the plate thereof is connected to the inner conductor 33 of the transmission line 31; and similarly, the magnetron 44 is tuned to a second frequency $f_2$ in the ultra-high frequency band (such, for example, as 2450 mc.), and the plate thereof is connected to the inner conductor 43 of the transmission line 41. Accordingly, the spread between $f_1$ and $f_2$ is at least 1000 mc., this spread being 1535 mc. in the present example. The circuit of the oscillator 30, including the magnetron 34, is supplied with power via terminals to which two conductors 125 and 126 are connected; and similarly, the circuit of the oscillator 40, including the magnetron 44, is supplied with power via terminals to which two conductors 127 and 128 are connected. The electric heating units 21 and 22 may be of any suitable type, and are connected, as illustrated in the present example, in parallel relation across two conductors 129 and 130.

Further the oven 10 is provided with a door switch 24 that includes a contact bridging member 25, the door switch 24 being moved into its respective closed and open positions in response to corresponding movements of the front door section 12 into its closed and open positions. In the oven 10 the transmission lines 31 and 41 may terminate upon the rear wall of the metal inner liner 14; and in the arrangement illustrated, the antenna 43 is disposed immediately above the antenna 33, and a metal baffle 23 is electrically connected to the rear wall of the metal inner liner 14 and projects forwardly into the oven chamber 13 in shielding relation with respect to the antennae 33 and 43. This arrangement minimizes cross-feed-back of electromagnetic wave energy from the oven chamber 13 into the transmission lines 31 and 41. Also the adjacent positions of the antennae 33 and 43 upon the rear wall of the metal inner liner 14, with the baffle 23 therebetween, further minimizes the cross-feed-back of the electromagnetic wave energy mentioned. This arrangement prevents the possibility of damage to each of the magnetrons 34 and 44 that might result from the feed-back of the electromagnetic wave energy from the other of the magnetrons mentioned.

Also the circuit comprises a source of electric power supply of the 3-wire Edison type of 236 volts, single-phase, A.-C., including two outside conductors 101 and 102 and a grounded neutral conductor 103. The conductors 101 and 102 are respectively connected via two fuses 104 and 106 to two supply conductors 105 and 107. Also three electromagnetic relays 140, 150 and 160 are provided; the relay 140 controlling a pair of contact bridging members 141 and 142 for connecting the feed conductors 105 and 107 to the supply conductors 125 and 126; the relay 150 controlling a pair of contact bridging members 151 and 152 for connecting the feed conductors 105 and 107 to the supply conductors 127 and 128; and the relay 160 controlling a pair of contact bridging members 161 and 162 for connecting the feed conductors 105 and 107 to the supply conductors 129 and 130.

Accordingly, it will be understood that when the relay 140 is operated, the feed conductors 105 and 107 are connected to the supply conductors 125 and 126 effecting operation of the oscillator 30, with the result that the first electromagnetic wave energy of the frequency $f_1$ is supplied into the oven chamber 13. Similarly, when the relay 150 is operated, the feed conductors 105 and 107 are connected to the supply conductors 127 and 128 effecting operation of the oscillator 40, with the result that the second electromagnetic wave energy of the frequency $f_2$ is supplied into the oven chamber 13. Finally, when the relay 160 is operated, the feed conductors 105 and 107 are connected to the supply conductors 129 and 130, with the result that the electric heating units 21 and 22 are energized in parallel relation respectively effecting electric or thermal heating of the upper and lower portions of the oven chamber 13. In the arrangement, the electric heating unit 21 normally has a considerably higher wattage rating than the lower heating unit 22 so that the dominant cooking effect that is produced in the oven chamber 13 is a broiling effect.

Further the circuit comprises two independent manually operable program controllers, respectively designated timer No. 1 and timer No. 2. Timer No. 1 comprises a rotatably mounted operating shaft 51 carrying a manually operable dial 52 on the outer end thereof that cooperates with an associated index marker 52a, the dial 52 having an off or 0 position and carrying suitable time indicia that may be calibrated in terms of minutes. Also, timer No. 1 is provided with a timer motor 55 having an operating shaft 56 that is connected to reduction gearing 57 provided with an output shaft 58, the output shaft 58 being connected to the associated inner end of the operating shaft 51 by an associated slip clutch 59 of the friction type. Further, the operating shaft 51 carries an involuted control cam 53, as well as an off-normal control cam C54; which off-normal control cam C54 governs an associated off-normal switch S54. In the arrangement, when the manual dial 52 is rotated in the clockwise direction out of its off position, in accordance with a time setting, the cam C54 closes the normally open switch S54 to prepare a circuit for operating the timer motor 55; which circuit, when completed, causes operation of the timer motor 55 at a time-controlled rate so that the operating shaft 51 is driven or rotated in the counter clockwise direction back toward its off position, with the result that the manual dial 52 is restored back into its off position in a time interval corresponding to the preset time interval thereof with respect to the index marker 52a. Similarly, timer No. 2 comprises a rotatably mounted operating shaft 61 carrying a manually operable dial 62 on the outer end thereof that cooperates with an associated index marker 62a, the dial 62 having an off or 0 position and carrying suitable time indicia that may be calibrated in terms of minutes. Also, timer No. 2 is provided with a timer motor 65 having an operating shaft 66 that is connected to reduction gearing 67 provided with an output shaft 68, the output shaft 68 being connected to the associated inner end of the operating shaft 61 by an associated slip clutch 69 of the friction type. Further, the operating shaft 61 carries an involuted control cam 63, as well as an off-normal control cam C64; which off-normal control cam C64 governs an associated off-normal switch S64. In the arrangement, when the manual dial 62 is rotated in the clockwise direction out of its off position, in accordance with a time setting, the cam C64 closes the normally open switch S64 to prepare a circuit for operating the timer motor 65; which circuit, when completed, causes operation of the timer motor 65 at a time-controlled rate so that the operating shaft 61 is driven or rotated in the counter clockwise direction back toward its off position, with the result that the manual dial 62 is restored back into its off position in a time interval corresponding to the preset time interval thereof with respect to the index marker 62a.

Further the timer system comprises a differential switch 70 that is governed jointly by timer No. 1 and timer No. 2. Specifically the differential switch 70 comprises a pair of elongated switch springs 71 and 72 that are mounted at corresponding fixed ends thereof upon a suitable insulating support 73, and a pair of elongated switch springs 81 and 82 that are mounted at corresponding fixed ends thereof upon a suitable insulating support 83. The switch springs 71 and 72 respectively cooperate with the switch springs 81 and 82; and in the arrangement, the switch springs 71 and 72 are respectively arranged on the outsides of the respective switch springs 81 and 82. The switch springs 71 and 72 are operated by a common insulating push rod 74 that cooperates at one end thereof with the involuted cam 53 and cooperates at the other end thereof with a compression spring 77 acting against an associated support 78, the push rod 74 carrying two pins 75 and 76 respectively engaging the switch springs 71 and 72. The switch springs 81 and 82 are operated by a common insulating push rod 84 that cooperates at one end thereof with the involuted cam 63 and cooperates at the other end thereof with a compression spring 87 acting against an associated support 88, the push rod 84 carrying two pins 85 and 86 respectively engaging the switch springs 81 and 82. In the arrangement, when timer No. 1 occupies its off position the compression spring 77 urges the push rod 74 toward the left, allowing the switch springs 71 and 72, due to their inherent resiliency, to follow toward the left the respective pins 75 and 76. Similarly, when timer No. 2 occupies its off position the involuted cam 63 urges the push rod 84 toward the left to compress the compression spring 87, and allowing the switch springs 81 and 82, due to their inherent resiliency, to follow toward the left the respective pins 85 and 86. Accordingly, at this time, the low portion of the cam 53 engages the adjacent end of the push rod 74 so that the spring 77 is substantially uncompressed, while the high portion of the cam 63 engages the adjacent end of the push rod 84 so that the spring 87 is substantially compressed. More particularly at this time, the switch spring 81 is urged into engagement with the switch spring 71 and the switch spring 72 is urged into engagement with the switch spring 82.

In the construction of the cam 53, the radial distance between the center line of the operating shaft 51 and the cooperating end of the push rod 74 increases substantially directly with the angle of rotation of the dial 52 in the clockwise direction out of its off position. On the other hand, in the construction of the cam 63, the radial distance between the center line of the operating shaft 61 and the cooperating end of the push rod 84 decreases substantially directly with the angle of rotation of the dial 62 in the clockwise direction out of its off position.

Considering now the general mode of operation of the differential switch 70 and assuming that both timer No. 1 and timer No. 2 occupy their off positions, the switch springs 71 and 72 respectively engage the switch springs 81 and 82, the compression spring 77 is substantially uncompressed and the compression spring 87 is substantially fully compressed. At this time, it may be assumed that timer No. 1 is operated out of its off position to preset a given time interval $t_1$; whereby the involuted cam 53 is rotated with the operating shaft 51 in the clockwise direction so as to urge the push rod 74 toward the right effecting compression of the spring 77. As the push rod 74 is moved toward the right, the two pins 75 and 76 carried thereby respectively flex the switch springs 71 and 72 toward the right, with the result that the switch spring 71 is urged into firmer engagement with the switch spring 81 while the switch spring 72 is urged into disengagement with the switch spring 82. Consequently at this time a circuit, described hereinafter, is completed between the switch springs 71 and 81, while a circuit, described hereinafter, is interrupted between the switch springs 72 and 82. Now it may be assumed that timer No. 2 is operated to preset a given time interval $t_2$; whereby the involuted cam 63 is rotated with the operating shaft 61 in the clockwise direction 29 to relieve the push rod 84, allowing the compression spring 87 to urge the push rod 84 toward the right. As the push rod 84 is moved toward the right, the pins 85 and 86 carried thereby respectively flex the switch springs 81 and 82 toward the right, with the result that the switch spring 81 is moved away from the switch spring 71 and the switch spring 82 is moved toward the switch spring 72. At this time, the relationship between the switch springs 71—81 and 72—82 is dependent upon the relationship between the time interval $t_1$ set by timer No. 1 and the time interval $t_2$ set by timer No. 2. More particularly, in the event the time interval $t_1$ is equal to the time $t_2$, then the switch spring 71 engages the switch spring 81 and the switch spring 72 engages the switch spring 82. In the event the time interval $t_1$ is greater than the time interval $t_2$, then the switch spring 71 engages the switch spring 81 and the switch spring 72 disengages the switch spring 82. Finally, in the event the time interval $t_1$ is less than the time interval $t_2$, then the switch spring 81 disengages the switch spring 71 and the switch spring 82 engages the switch spring 72.

Now assuming that the time interval $t_1$ is greater than the time interval $t_2$, the switch spring 71 engages the switch spring 81 and the switch spring 72 disengages the switch spring 82, as noted above; whereby the previously mentioned circuit is completed via the switch springs 71 and 81 effecting operation of the timer motor 55, with the result that the operating shaft 51 of timer No. 1 is rotated in the counter clockwise direction as time passes, so that subsequently the residual time interval set by timer No. 1 is equal to the time interval $t_2$ preset by timer No. 2; whereby at this time, the differential switch 70 is operated so that the switch spring 72 engages the switch spring 82, while the switch spring 71 is in engagement with the switch spring 81. Accordingly, at this time, the previously mentioned circuit via the switch springs 72 and 82 is completed for operating the timer motor 65 so as to return the operating shaft 61 of timer No. 2 back toward its off position, whereby during the remainder of the time interval the two timers are returned simultaneously back into their off positions, with the result that the timing operations of the two timers are terminated simultaneously, and with the result that the controls respectively governed by timer No. 1 and by timer No. 2 are effected for the respective time intervals $t_1$ and $t_2$.

Finally, the control circuit comprises a manually operable selector switch 90 that is provided with three contact wipers 91, 92 and 93 that are simultaneously operated by virtue of an operative interconnection 74 therebetween. Also each of the wipers 91, 92 and 93 is provided with an associated contact bank including nine individual contacts. The contacts in the three contact banks mentioned are variously strapped to three control conductors 121, 122 and 123, as indicated in the following table:

| Contacts | Bank of Wiper 91 | Bank of Wiper 92 | Bank of Wiper 93 |
|---|---|---|---|
| 1 | 121 | open | open |
| 2 | 122 | open | open |
| 3 | 123 | open | open |
| 4 | 121 | open | 122 |
| 5 | 121 | open | 123 |
| 6 | 122 | open | 123 |
| 7 | 121 | 122 | 123 |
| 8 | 121 | 123 | 122 |
| 9 | 122 | 123 | 121 |

The wipers 91 and 92 are commonly connected to a conductor 109, and the wiper 93 is individually connected to a conductor 111. The control conductor 121 is connected to one terminal of the winding of the relay 140; the control conductor 122 is connected to one terminal of the winding of the relay 150; and the control 123 is connected to one terminal of the winding of the relay 160. The other terminal of the winding of the relay 140 and the other terminal of the winding of the relay 150 are commonly connected to a conductor 124 that is terminated by one of the contacts cooperating with the bridging member 25, the other contact of this pair being connected to the grounded neutral conductor 103. The other terminal of the winding of the relay 160 is directly connected to the grounded neutral conductor 103.

The feed conductor 105 is connected in multiple to the switch springs 71 and 72; while the switch springs 81 and 82 are respectively connected to two conductors 108 and 110. The conductor 108 is terminated by one spring of the switch S54 and the other spring thereof terminates the conductor 109. The conductor 110 is terminated by one spring of the switch S64, and the other spring thereof terminates the conductor 111. The terminals of the timer motor 55 are bridged between the conductor 109 and the grounded neutral conductor 103; and the terminals of the timer motor 65 are bridged between the conductor 111 and the grounded neutral conductor 103.

Consider now in greater detail the mode of operation of the timer arrangement and again assume that timer No. 1 has been manually operated to preset a time interval $t_1$ and that timer No. 2 has been manually operated to preset a time interval $t_2$, wherein $t_1$ is greater than $t_2$.

This joint control of the operating shafts 51 and 61 governs the differential switch 70 in the manner previously explained, whereby the switch spring 71 engages the switch spring 81, while the switch spring 72 disengages the switch spring 82. Also at this time, the cam C54 closes the switch S54 and the cam C64 closes the switch S64. Hence, the previously mentioned circuit for operating the timer motor 55 is completed and extends from the feed conductor 105 via the switch springs 71 and 81, the conductor 108, the closed switch S54 and the conductor 109 to one terminal of the timer motor 55, the other terminal thereof being connected to the grounded neutral conductor 103. Accordingly, the timer motor 54 is operated so as to rotate the operating shaft 51 in the counter clockwise direction at the timed rate, thereby returning the manual dial 52 back toward its off position. Subsequently when the residual time set by timer No. 1 is equal to the time interval $t_2$ initially preset by timer No. 2, the operating shafts 51 and 61 govern the differential switch 70 so that the switch spring 72 engages the switch spring 82 while the switch spring 71 is in engagement with the switch spring 81. Closure of the switch spring 72 to the switch spring 82 completes a circuit for operating the timer motor 65, that includes the feed conductor 105, the switch springs 72 and 82, the conductor 110, the closed switch S64, the conductor 111 and the grounded neutral conductor 103. Accordingly, at this time operation of the timer motor 65 is initiated, while operation of the timer motor 55 is continued, whereby timer No. 1 and timer No. 2 are both operated back toward their off positions.

When timer No. 1 is returned back into its off position, the cam C54 opens the switch S54 thereby to interrupt the circuit for operating the timer motor 55 and to remove the control potential from the conductor 109 extending to the wipers 91 and 92 of the selector switch 90. When timer No. 2 is returned back into its off position, the cam C64 opens the switch S64 thereby to interrupt the circuit for operating the timer motor 65 and to remove the control potential from the conductor 111 extending to the wiper 93 of the selector switch 90. Accordingly, further operation of timer No. 1 is arrested, and during operation thereof the control potential was present upon the control conductor 109 throughout the time interval $t_1$ corresponding to that preset by the manual dial 52. Similarly, further operation of timer No. 2 is arrested, and during operation thereof the control potential was present upon the control conductor 111 throughout the time interval $t_2$ corresponding to that preset by the manual dial 62. Furthermore, the two time intervals $t_1$ and $t_2$ terminated together.

In view of the foregoing it may be generalized that when the two timers (timer No. 1 and timer No. 2) are manually preset in accordance with two time intervals that are different, then the one of the timers that presets the longer time interval is first operated; and thereafter when the residual time interval in the operating one of the timers is equal to the initial time interval preset by the other of the timers, the operation of the other of the timers is initiated; whereby the two timers are then returned back into their off positions simultaneously.

Now the cooking controls that are effected by the two timers in the oven 10 is dependent upon the position of the selector switch 90 which is normally preset, prior to presetting of timer No. 1 and timer No. 2, to preestablish the desired cooking controls mentioned. For example, when the selector switch 90 occupies its first position so that the wipers 91, 92 and 93 respectively engage the first contacts in the associated contact banks, only the relay 140 may be controlled by timer No. 1; whereby in this case, timer No. 1 may be manually operated to preset a desired deep electronic cooking effect during a corresponding time interval, since the relay 140 that is preselected governs operation of the generator 30 and the consequent supply of the electromagnetic energy of the frequency $f_1$ into the oven chamber 13.

Similarly, when the selector switch 90 occupies its second position so that the wipers 91, 92 and 93 respectively engage the second contacts in the associated contact banks, only the relay 150 may be controlled by timer No. 1; whereby in this case, timer No. 1 may be manually operated to preset a desired shallow electronic cooking effect during a corresponding time interval, since the relay 150 that is preselected governs operation of the generator 40 and the consequent supply of the electromagnetic energy of the frequency $f_2$ into the oven chamber 13.

Similarly, when the selector switch 90 occupies its third position so that the wipers 91, 92 and 93 respectively engage the third contacts in the associated contact banks, only the relay 160 may be controlled by timer No. 1; whereby in this case, timer No. 1 may be manually operated to preset a desired thermal or electric cooking effect during a corresponding time interval, since the relay 160 that is preselected governs energization of the heating units 21 and 22.

Now on the other hand, when the selector switch 90 occupies its fourth position the wiper 91 preselects the relay 140 and the wiper 93 preselects the relay 150. Whereby in this case, timer No. 1 may be selectively operated to preset a desired time interval for the deep electronic cooking effect and timer No. 2 may be selectively operated to preset a desired time interval for the shallow electronic cooking effect. Now either of these time intervals may be longer than the other, but both of these time intervals will be concluded together, as previously explained, whereby the two cooking effects mentioned in the oven chamber 13 will terminate together, the cooking effect desired for the longer time interval being first initiated.

In view of the above explanation of the operation of the selector switch 90 to preselect in its fourth position the deep electronic cooking effect and the shallow electronic cooking effect to be governed respectively by timer No. 1 and timer No. 2, it will be understood that in the fifth position of the selector switch 90 the deep electronic cooking effect and the thermal or electric cooking effect are respectively preselected to be governed respectively by timer No. 1 and timer No. 2, and that in the sixth position of the selector switch 90 the shallow electronic cooking effect and the thermal or electric cooking effect are respectively preselected to be governed respectively by timer No. 1 and timer No. 2.

When the selector switch 90 occupies its seventh position, the wipers 91 and 92 simultaneously select the relays 140 and 150, while the wiper 93 selects the relay 160; whereby in this case, timer No. 1 may be manually operated to preset a time interval during which the deep electronic cooking effect and the shallow electronic cooking effect proceed simultaneously, and timer No. 2 may be manually operated to preset a time interval during which the thermal or electric cooking effect proceeds; which two time intervals terminate together in the manner previously explained.

When the selector switch 90 occupies its eighth position, the wipers 91 and 92 simultaneously select the relays 140 and 160, while the wiper 93 selects the relay 150; whereby in this case, timer No. 1 may be manually operated to preset a time interval during which the deep electronic cooking effect and the thermal or electric cooking effect proceed simultaneously, and timer No. 2 may be manually operated to preset a time interval during which the shallow electronic cooking effect proceeds; which two time intervals terminate together in the manner previously explained.

Finally, when the selector 90 occupies its ninth position, the wipers 91 and 92 simultaneously select the relays 150 and 160, while the wiper 93 selects the relay 140; whereby in this case, timer No. 1 may be manually operated to preset a time interval during the shallow electronic cooking effects and the thermal or electric cooking effect proceed simultaneously, and timer No. 2 may be manually operated to preset a time interval during which the deep electronic cooking effect proceeds; which two time intervals terminate together in the manner previously explained.

In the foregoing explanation of the selective controls of the relays 140 and 150 it has been assumed that the door section 12 occupies its closed position with respect to the housing section 11, since the door switch 24 must occupy its closed position in order to effect the energization of the relays 140 and 150, as the operating circuits of these relays include the common conductor 124 that must be connected to the grounded neutral conductor 103 in the door switch 24 in its closed position to render effective the application of the control potential to the control conductors 121 and 122. On the other hand the relay 160 may be controlled directly via the control conductor 123 and regardless of the position of the front door section 12, since it is frequently desirable to carry out broiling operations in the oven chamber 13 with the front door section 12 in a cracked or partially opened position. However, as noted above the front door section 12 must occupy its fully closed position in order to carry out either of the electronic cooking effects in the cooking chamber 13, since it is not permissible for the electronic wave energy to escape from the oven chamber 13.

In view of the foregoing it will be understood that any one of the three cooking effects may be preselected by the selector switch 90 for control during a time interval preset by timer No. 1, and that any two of the three cooking effects may be preselected by the selector switch 90 for respective control during respective time intervals preset by timer No. 1 and by timer No. 2, and that any two of the three cooking effects may be preselected for simultaneous control by timer No. 1 together with selection of the third of the three cooking effects for control by timer No. 2.

Turning now to the various cooking effects that may be selectively carried out in the oven cavity 13, it will be understood that in the cooking of certain food products of relatively small mass the desired cooking effect can be readily achieved utilizing only the electromagnetic wave energy of the relatively high frequency $f_2$; whereas in the cooking of other food products of relatively large mass the desired cooking effect can be best achieved utilising the electromagnetic wave energy of relatively low frequency $f_1$. Of course in the thawing of frozen foods either the electromagnetic wave energy or the thermal or electric heating effect may be employed, as desired. Now in the cooking of other foods, such, for example, as roasts it is highly desirable to utilize the deep electronic cooking effect in conjunction with the browning effect which may be achieved by utilizing either or both the shallow electronic cooking effect or the thermal or electric cooking effect. For example, after a roast has been cooked fundamentally by the deep electronic cooking effect it may be quickly browned by the utilization for a very short time interval of the shallow electronic cooking effect, or it may be quickly browned by the utilization of the thermal or electric cooking effect.

Also in the preparation of certain combination meals in the oven chamber 13 the utilization of both one or more of the electronic cooking effects, in combination with the thermal or electric cooking effect, is very advantageous. For example, a roast may be placed in the oven chamber 13 and vegetables may be arranged in an enclosing metallic vessel and also placed in the oven chamber 13. Thereafter, the deep electronic cooking effect may be employed for the purpose of cooking the roast, but this cooking effect has no action upon the vegetables due to the shielding thereof by the enclosing metallic vessel. However, subsequently the thermal or electric cooking effect may be employed in the oven chamber 13 for the dual purpose of browning the roast and of cooking the vegetable arranged in the enclosing metallic vessel.

In view of the foregoing it is apparent that there has been provided an improved timer system for heating apparatus, or the like, and particularly for a combination electronic and electric oven, whereby various combinations of cooking effects may be carried out throughout different time intervals and yet terminated together in a highly desirable manner.

While there has been described what is at present considered to be the preferred embodiment of the invention, it will be understood that various modifications may be made therein, and it is intended to cover in the appended claims all such modfiications as fall within the true spirit and scope of the invention.

What is claimed is:

1. In cooking apparatus, the combination comprising first and second independent manually operable members respectively corresponding to first and second distinct cooking effects in said apparatus, each of said members including an off position and a variable on position and being selectively operative into its variable on position to preset a corresponding variable time interval, whereby said members may be selectively operated initially to preset either the same time interval or different time intervals, timer mechanism operative to return each of said members from its variable on position back into its off position in a time interval corresponding to that preset thereby, means responsive to operations of said members to preset different time intervals for operating said timer mechanism to return toward its off positon only the one of said members presetting the longer time interval, whereby said one member is subsequently operated by said timer mechanism to preset a residual time interval that is the same as that preset by the other of said members, means responsive to the operations of said members to preset the same time interval for operating said timer mechanism to return toward their off positions both of said members, whereby each of said members is returned from its variable on position back into its off position during the time interval individually preset thereby and both of said members are returned back into their off positions substantially simultaneously regardless of the individual time intervals respectively initially preset thereby, first control means governed during the individual time interval of the return of said first member back into its off position for producing the corresponding first cooking effect in said apparatus, and second control means governed during the individual time interval of the return of said second member back into its off position for producing the corresponding second cooking effect in said apparatus.

2. In cooking apparatus, the combination comprising first and second independent manually operable members respectively corresponding to first and second distinct cooking effects in said apparatus, each of said members including an off position and a variable on position and being selectively operative into its variable on position to preset a corresponding variable time interval, whereby said members may be selectively operated initially to preset either the same time interval or different time intervals, timer mechanism operative to return each of said members from its variable on position back into its off position in a time interval corresponding to that preset thereby, differential mechanism operated jointly by said members and having three control positions, said differential mechanism being operated into a first of its control positions in response to operations of said first and second members respectively to preset relatively long and relatively short time intervals, said differential mechanism being operated into a second of its control positions in response to operations of said first and second members respectively to preset relatively short and relatively long time intervals, said differential mechanism being operated into a third of its control positions in response to operations of said first and second members to preset the same time interval, switching mechanism selectively operative to produce said first and second cooking effects in said aparatus, means responsive to operation of said differential mechanism into its first control position for operating said timer mechanism to return toward its off position only said first member and for operating said switching mechanism to produce said first cooking effect, means responsive to operation of said differential mechanism into its second control position for operating said timer mechanism to return toward its off position only said second member and for operating said switching mechanism to produce said second cooking effect, and means responsive to operation of said differential mechanism into its third control position for operating said timer mechanism to return toward their off positions both said first member and said second member and for operating said switching mechanism to produce both said first cooking effect and said second cooking effect.

3. In cooking apparatus, the combination comprising first and second independent manually operable members, each of said members including an off position and a variable on position and being selectively operative into its variable on position to preset a corresponding variable time interval, whereby said members may be selectively operated initially to preset either the same time interval or different time intervals, timer mechanism operative to return each of said members from its variable on position back into its off position in a time interval corresponding to that preset thereby, means responsive to operations of said members to preset different time intervals for operating said timer mechanism to return toward its off position only the one of said members presetting the longer time interval, whereby said one member is subsequently operated by said timer mechanism to preset a residual time interval that is the same as that preset by the other of said members, means responsive to operations of said members to preset the same time interval for operating said timer mechanism to return toward their off positions both of said members, whereby each of said members is returned from its variable on position back into its off position during the time interval individually preset thereby and both of said members are returned back into their off positions substantially simultaneously regardless of the individual time intervals respectively initially preset thereby, first and second control conductors, first control means governed during the individual time interval of the return of said first member back into its off position for applying a control potential to said first control conductor, second control means governed during the individual time interval of the return of said second member back into its off position for applying a control potential to said second control conductor, three cooking controllers, and a manually operable selector for selectively connecting said first and second control conductors respectively to each combination of two of said three cooking controllers, each of said cooking controllers being operative in response to the application of a control potential to one of said control conductors connected thereto to produce a corresponding cooking effect in said apparatus.

4. In cooking apparatus, the combination comprising first and second independent manually operable members, each of said members including an off position and a variable on position and being selectively operative into its variable on position to preset a corresponding variable time interval, whereby said members may be selectively operated initially to preset either the same time interval or different time intervals, timer mechanism operative to return each of said members from its variable on position back into its off position in a time interval corresponding to that preset thereby, means responsive to operations of said members to preset different time intervals for operating said timer mechanism to return toward its off position only the one of said members presetting the longer time interval, whereby said one member is subsequently operated by said timer mechanism to preset a residual time interval that is the same as that preset by the other of said members, means responsive to operations of said members to preset the same time interval for operating said timer mechanism to return toward their off positions both of said members, whereby each of said members is returned from its variable on position back into its off position during the time interval individually preset thereby and both of said members are returned back into their off positions substantially simultaneously regardless of the individual time intervals respectively initially preset thereby, first and second control conductors, first control means governed during the individual time interval of the return of said first member back into its off position for applying a control potential to said first control conductor, second control means governed during the individual time interval of the return of said second member back into its off position for applying a control potential to said second control conductor, three cooking controllers, and a manually operable selector for selectively connecting said first control conductor to each combination of two of said three cooking controllers and for simultaneously connecting said second control conductor to the third of said three cooking controllers, each of said cooking controllers being operative in response to the application of a control potential to one of said control conductors connected thereto to produce a corresponding cooking effect in said apparatus.

5. A timer system comprising first and second independent manually operable members respectively corresponding to first and second distinct controls, each of said members including an off position and a variable on position and being selectively operative into its variable on position to preset a corresponding variable time interval, whereby said members may be selectively operated initially to preset either the same time interval or different time intervals, timer mechanism operative to return each of said members from its variable on position back into its off position in a time interval corresponding to that preset thereby, differential mechanism operated jointly by said members and having three control positions, said differential mechanism being operated into a first of its control positions in response to operations of said first and second members respectively to preset relatively long and relatively short time intervals, said differential mechanism being operated into a second of its control positions in response to operations of said first and second members respectively to preset relatively short and relatively long time intervals, said differential mechanism being operated into a third of its control positions in response to operations of said first and second members to preset the same time interval, switching mechanism selectively operative to produce said first and second controls, means responsive to operations of said differential mechanism into its first control position for operating said timer mechanism to return toward its off position only said first member and for operating said switching mechanism to produce said first control, means responsive to operation of said differential mechanism into its second control position for operating said timer mechanism to return toward its off position only said second member and for operating said switching mechanism to produce said second control, and means responsive to operation of said differential mechanism into its third control position for operating said timer mechanism to return toward their off positions both said first member and said second member and for operating said switching mechanism to produce both said first control and said second control.

6. A timer system comprising first and second rotatably mounted members respectively corresponding to first and second distinct controls, first and second manually operable elements for respectively rotating said members independently of each other, each of said members including an off position and a variable on position and being selectively rotatable into its variable on position to preset a corresponding variable time interval, whereby said members may be selectively rotated initially to preset either the same time interval or different time intervals, timer mechanism operative to return each of said members from its variable on position back into its off position in a time interval corresponding to that preset thereby, differential mechanism operated jointly by said members and having three control positions, said differential mechanism being operated into a first of its control positions in response to rotations of said first and second members respectively to preset relatively long and relatively short time intervals, said differential mechanism being operated into a second of its control positions in response to rotations of said first and second members respectively to preset relatively short and relatively long time intervals, said differential mechanism being operated into a third of its control positions in response to rotations of said first and second members to preset the same time interval, switching mechanism selectively operative to produce said first and second controls, means responsive to operation of said differential mechanism into its first control position for operating said timer mechanism to return toward its off position only said first member and for operating said switching mechanism to produce said first control, means responsive to operation of said differential mechanism into its second control position for operating said timer mechanism to return toward its off position only said second member and for operating said switching mechanism to produce said second control, and means responsive to operation of said differential mechanism into its third control position for operating said timer mechanism to return toward their off positions both said first member and said second member and for operating said switching mechanism to produce both said first control and said second control.

7. A timer system comprising first and second independent manually operable members respectively corresponding to first and second distinct controls, each of said members including an off position and a variable on position and being selectively operative into its variable on position to preset a corresponding variable time interval, whereby said members may be selectively operated initially to preset either the same time interval or different time intervals, first and second timer motors respectively operative to return said first and second members from their respective variable on positions back into their respective off positions in time intervals respectively corresponding to those respectively preset thereby, differential mechanism operated jointly by said members and having three control positions, said differential mechanism being operated into a first of its control positions in response to operations of said first and second members respectively to preset relatively long and relatively short time intervals, said differential mechanism being operated into a second of its control positions in response to operations of said first and second members respectively to preset relatively short and relatively long time intervals, said differential mechanism being operated into a third of its control positions in response to operations of said first and second members to preset the same time interval, switching mechanism selectively operative to produce said first and second controls, means responsive to operation of said differential mechanism into its first control position for operating said first timer motor and for operating said switching mechanism to produce said first control, means responsive to operation of said differential mechanism into its second control position for operating said second timer motor and for operating said switching mechanism to produce said second control, and means responsive to operation of said differential mechanism into its third control position for operating both said first timer motor and said second timer motor and for operating said switching mechanism to produce both said first control and said second control.

8. A timer system comprising first and second independent manually operable members respectively corresponding to first and second distinct controls, each of said members including an off position and a variable on position and being selectively operative into its variable on position to preset a corresponding variable time interval, whereby said members may be selectively operated initially to preset either the same time interval or different time intervals, timer mechanism operative to return each of said members from its variable on position back into its off position in a time interval corresponding to that preset thereby, differential switching mechanism operated jointly by said members and including first and second control switches, said first and second control switches being operated respectively into their closed and open positions in response to operations of said first and second members respectively to preset relatively long and relatively short time intervals, said first and second control switches being operated respectively into their open and closed positions in response to operations of said first and second members respectively to preset relatively short and relatively long time intervals, said first and second control switches both being operated into their closed positions in response to operations of said first and second members to preset the same time interval, means responsive to closure of said first control switch for operating said timer mechanism to return toward its off position said first member and for producing said first control, and means responsive to closure of said second control switch for operating said timer mechanism to return toward its off position said second member and for producing said second control.

9. A timer system comprising first and second independent manually operable members respectively corresponding to first and second distinct controls, each of said members including an off position and a variable on position and being selectively operative into its variable on position to preset a corresponding variable time interval, whereby said members may be selectively operated initially to preset either the same time interval or different time intervals, timer mechanism operative to return each of said members from its variable on position back into its off position in a time interval corresponding to that preset thereby, a first normal switch operated into its respective open and closed positions in response to operation of said first member into its respective off and on positions, a second normal switch operated into its respective open and closed positions in response to operation of said second member into its respective off and on positions, differential switching mechanism operated jointly by said members and including first and second control switches, said first and second switches being operated respectively into their closed and open positions in response to operations of said first and second members respectively to preset relatively long and relatively short time intervals, said first and second control switches being operated respectively into their open and closed positions in response to operations of said first and second members respectively to preset relatively short and relatively long time intervals, said first and second control switches both being operated into their closed positions in response to operations of said first and second members to preset the same time interval, means jointly responsive to closure of said first normal switch and to closure of said first control switch for operating said timer mechanism to return toward its off position said first member and for producing said first control, and means jointly responsive to closure of said second normal switch and to closure of said second control switch for operating said timer mechanism to return toward its off position said second member and for producing said second control.

10. A timer system comprising first and second independent manually operable members respectively corresponding to first and second distinct controls, each of said members including an off position and a variable on position and being selectively operative into its variable on position to preset a corresponding variable time interval, whereby said members may be selectively operated initially to preset either the same time interval or different time intervals, timer mechanism operative to return each of said members from its variable on position back into its off position in a time interval corresponding to that preset thereby, differential switching mechanism including four individual switch springs arranged so that first and second of said switch springs cooperate to constitute a first control switch and so that third and fourth of said switch springs cooperate to constitute a second control switch, means responsive to operation of said first member away from its off position for moving said first and third switch springs respectively toward and away from said respectively cooperating second and fourth switch springs and responsive to operation of said first member back toward its off position for moving said first and third switch springs respectively away from and toward said respectively cooperating second and fourth switch springs, means responsive to operation of said second member away from its off position for moving said second and fourth switch springs respectively away from and toward said respectively cooperating first and third switch springs and responsive to operation of said second member back toward its off position for moving said second and fourth switch springs respectively toward and away from said respectively cooperating first and third switch springs, said first and second switches being operated respectively into their closed and open positions in response to operations of said first and second members respectively to preset relatively long and relatively short time intervals, said first and second control switches being operated respectively into their open and closed positions in response to operations of said first and second members respectively to preset relatively short and relatively long time intervals, said first and second control switches both being operated into their closed positions in response to operations of said first and second members to preset the same time interval, means responsive to closure of said first control switch for operating said timer mechanism to return toward its off position said first member and for producing said first control, and means responsive to closure of said second control switch for operating said timer mechanism to return toward its off position said second member and for producing said second control.

11. A timer system comprising first and second independent manually operable members respectively corresponding to first and second distinct controls, each of said members including an off position and a variable on position and being selectively operative into its variable on position to preset a corresponding variable time interval, whereby said members may be selectively operated initially to preset either the same time interval or different time intervals, timer mechanism operative to return each of said members from its variable on position back into its off position in a time interval corresponding to that preset thereby, differential switching mechanism including four individual switch springs each provided with a fixed end and a free end, the free ends of first and second of said switch springs cooperating to provide a first control switch and the free ends of third and fourth of said switch springs cooperating to provide a second control switch, means responsive to operation of said first member away from its off position for moving the free ends of said first and third switch springs respectively toward and away from the free ends of said respectively cooperating second and fourth switch springs and responsive to operation of said first member back toward its off position for moving the free ends of said first and third switch springs respectively away from and toward the free ends of said respectively cooperating second and fourth switch springs, means responsive to operation of said second member away from its off position for moving the free ends of said second and fourth switch springs respectively away from and toward the free ends of said respectively cooperating first and third switch springs and responsive to operation of said second member back toward its off position for moving the free ends of said second and fourth switch springs respectively toward and away from the free ends of said respectively cooperating first and third switch springs, said first and second control switches being operated respectively into their closed and open positions in response to operations of said first and second members respectively to preset relatively long and relatively short time intervals, said first and second control switches being operated respectively into their open and closed positions in response to operations of said first and second members respectively to preset relatively short and relatively long time intervals, said first and second control switches both being operated into their closed positions in response to operations of said first and second members to preset the same time interval, means responsive to closure of said first control switch for operating said timer mechanism to return toward its off position said first member and for producing said first control, and means responsive to closure of said second control switch for operating said timer mechanism to return toward its off position said second member and for producing said second control.

References Cited in the file of this patent
UNITED STATES PATENTS

| | | |
|---|---|---|
| 2,142,462 | Teeple | Jan. 3, 1939 |
| 2,663,786 | Illian et al. | Dec. 22, 1953 |
| 2,677,732 | Miller | May 4, 1954 |
| 2,744,990 | Schroeder | May 8, 1956 |
| 2,761,051 | Dodson | Aug. 28, 1956 |
| 2,817,724 | Skidgel | Dec. 24, 1957 |
| 2,839,649 | Macoicz | June 17, 1958 |